United States Patent [19]
Matsuyama et al.

[11] Patent Number: 6,081,315
[45] Date of Patent: Jun. 27, 2000

[54] LIQUID CRYSTAL DISPLAY APPARATUS

[75] Inventors: Hiroaki Matsuyama; Kazumi Kobayashi; Yoshihiko Hirai, all of Tokyo, Japan

[73] Assignee: NEC Corporation, Tokyo, Japan

[21] Appl. No.: 09/300,272

[22] Filed: Apr. 27, 1999

[30] Foreign Application Priority Data

May 7, 1998 [JP] Japan .................................. 10-124850

[51] Int. Cl.⁷ .......................... G02F 1/1343; G02F 1/136; G02F 1/1333
[52] U.S. Cl. ............................ 349/143; 349/43; 349/138; 349/139; 349/38
[58] Field of Search .................... 349/143, 141, 349/43, 138, 137, 38

[56] References Cited

U.S. PATENT DOCUMENTS

| | | | |
|---|---|---|---|
| 5,208,690 | 5/1993 | Hayashi et al. | 349/143 |
| 5,576,858 | 11/1996 | Ukai et al. | 349/38 |
| 5,847,781 | 12/1998 | Ono et al. | 349/43 |

FOREIGN PATENT DOCUMENTS

| | | |
|---|---|---|
| 6-230426 | 8/1994 | Japan . |
| 7-199190 | 8/1995 | Japan . |
| 8-101399 | 4/1996 | Japan . |
| 9-236821 | 9/1997 | Japan . |
| 10-20323 | 1/1998 | Japan . |

*Primary Examiner*—William L. Sikes
*Assistant Examiner*—Toan Ton
*Attorney, Agent, or Firm*—Foley & Lardner

[57] ABSTRACT

To provide a liquid crystal display apparatus with a wide seeing angle. The liquid crystal display apparatus of the present invention comprises a substrate with pixel electrodes, another substrate with a common electrode, and liquid crystal molecules between the substrates. Apertures are formed to divide each of the pixel electrodes into pieces for generating oblique electric fields to divide an orientation of the liquid crystal molecules. The divided pieces of the pixel electrodes are connected electrically through insulating layers at an electrode wiring portion. The control electrode for each of said pixel electrodes for controlling the orientation is placed between a boundary of the insulating layers.

3 Claims, 7 Drawing Sheets

LIQUID CRYSTAL DISPLAY APPARATUS

BACKGROUND OF THE INVENTION

1. Technical Field of the Invention

The present invention relates to a liquid crystal display apparatus and particularly, to its structure for widening a visual field angle.

2. Description of the Prior Art

Conventionally, a liquid crystal display apparatus utilizing twisted nematic (TN) liquid crystal is widely known. This equipment, however, has a disadvantage that the tone of color depends upon an angle of view due to the uniform orientation of the TN molecular in a pixel under an applied voltage. In order to reduce the visual angle dependence, the orientation of the liquid crystal molecules is divided by an oblique electric field by utilizing an aperture formed in each pixel electrode or common electrode. According to the above-mentioned orientation division, the image quality is improved, because each of the divided orientations compensates with each other.

Figure 4:
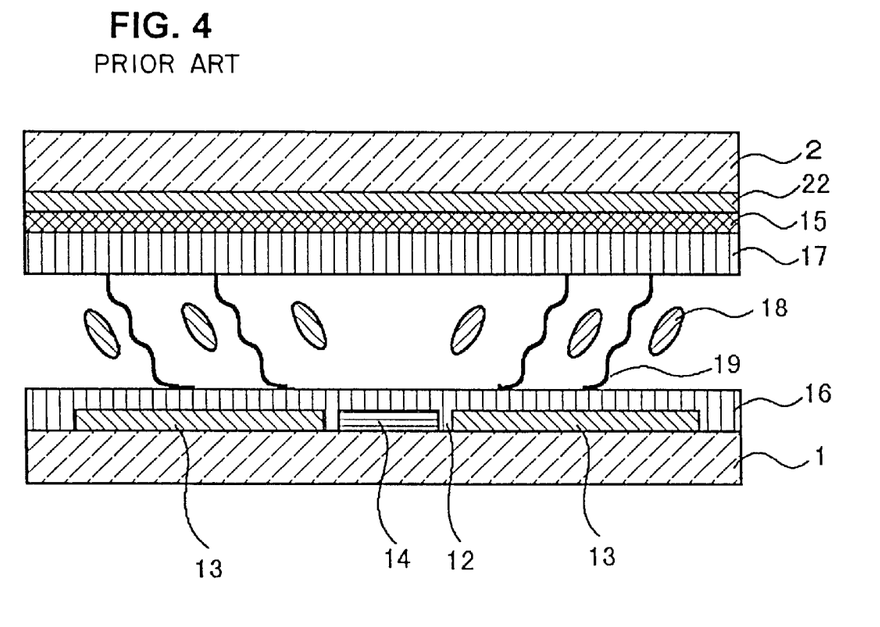
FIG. 4 is a cross sectional view of a conventional liquid display apparatus.
Figure 5:
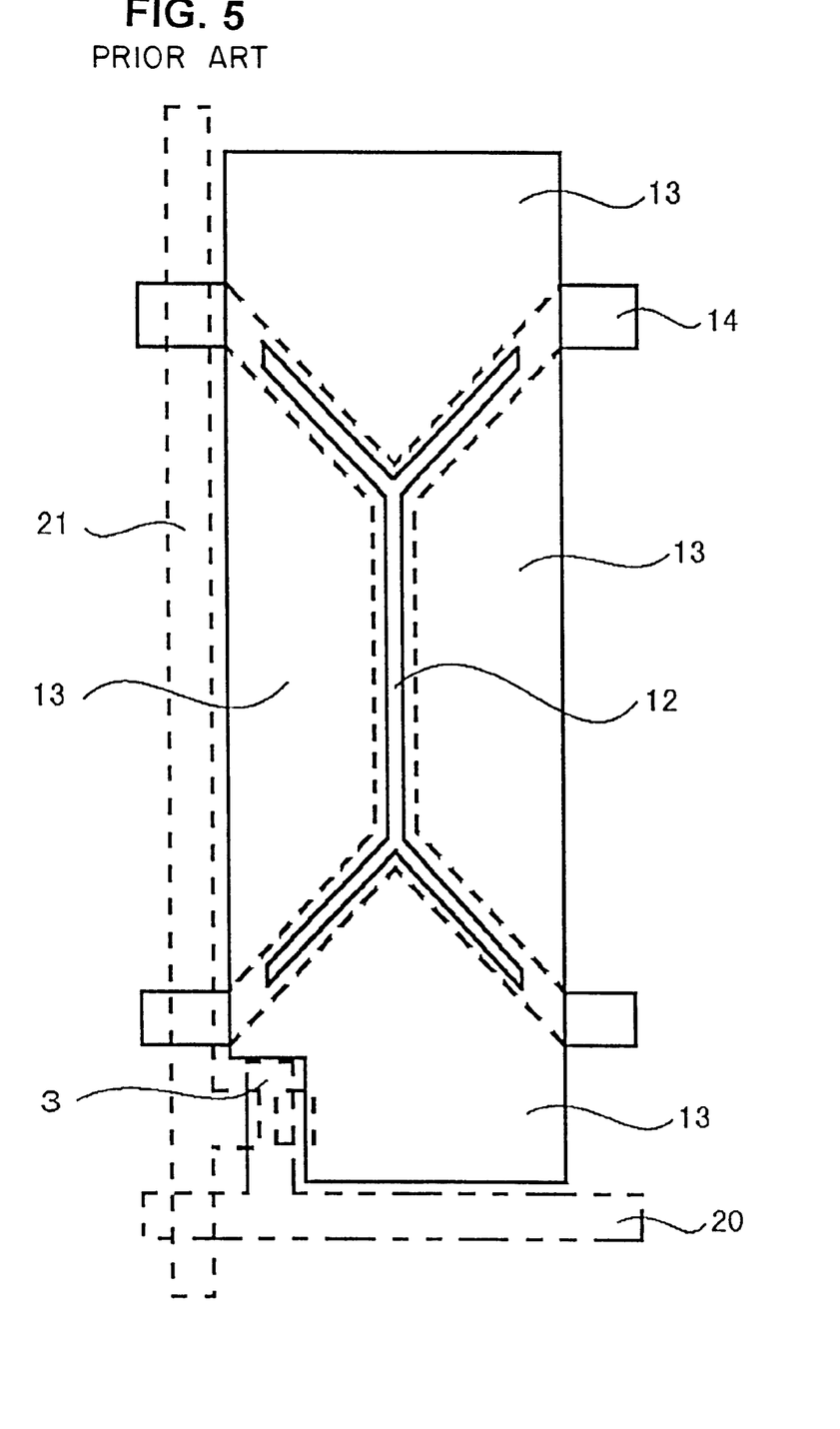
FIG. 5 is a plan view of the apparatus as shown in FIG. 4.

The orientation division as disclosed in JP10-20323 A (1998) is further explained, referring to a cross sectional view as shown in FIG. 4 and a plan view as shown in FIG. 5.

Aperture 12 is formed in pixel electrode 13. Further control electrode 14 is formed at the position of aperture 12. Concretely, control electrode 14 may be formed in the layer of pixel electrode, or in other layers over or under aperture 12. Further, pixel electrode 13 is insulated from control electrode 14 to apply different voltages. The oblique electric field is generated by the application of voltage to control electrode 14. Therefore, the orientation of liquid crystal molecules 18 is inclined into various directions. The orientation as shown in FIG. 4 is an exemplary orientation at the middle position in the direction of the layer thickness of the liquid crystal. Then, a small quantity of a monomer or olygomer added in liquid crystal 18 is polymerized by ultra violet (UV) exposure under the applied electric field. The generated polymer 19 fixes the orientation of liquid crystal molecules 18 even after switching off the voltage. The orientation of liquid crystal molecules 18 is varied by the voltage applied to pixel electrode, because polymer content in the liquid crystal layer is so small that only the initial orientation is fixed. Thus, the angular dependence of the tone of color can be reduced.

FIG. 5 is a plan view of an example as shown in JP 10-20323 A (1998). Control electrode 14 and gate electrode 3 are formed in the same layer in this example. Pixel electrode 13 can not be connected electrically with a driving circuit in the same plane as control electrode 14, if pixel electrode 13 is divided into parts completely by control electrode 14 in the same layer. Accordingly, in the above-mentioned example, control electrode 14 should be formed in a layer different from pixel electrode 13, because the same voltage should be applied to each of the divided parts in a pixel. On the contrary, pixel electrode 13 should be connected as shown in FIG. 5 in spite of the introduction of aperture 12, if control electrode 14 and pixel electrode 13 must be formed in the same layer.

However, the oblique electric field is not generated at several portions over pixel electrode 13, because pixel electrode is connected partially, or divided incompletely there. In this case, the displayed tone varies from pixel to pixel, depending upon the visual angle, or the angle at which the display is seen.

Figure 6:
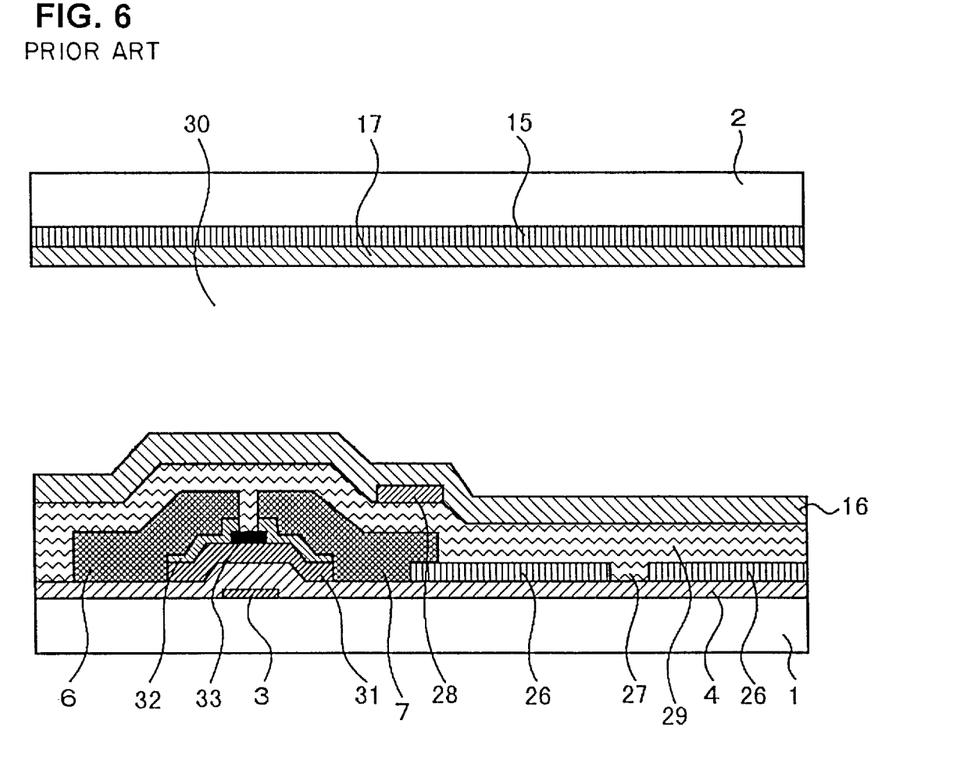
FIG. 6 is a cross sectional view of another conventional liquid display apparatus.
Figure 7:
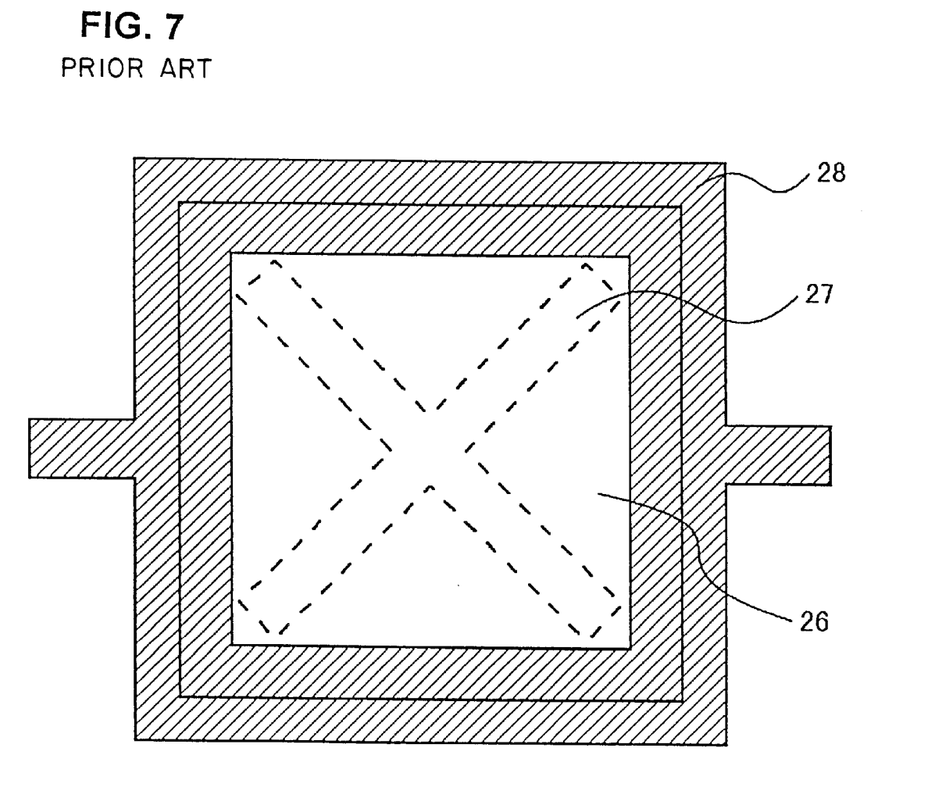
FIG. 7 is a plan view of the apparatus as shown in FIG. 6.

Another technology as shown in FIG. 6, concerning the aperture in the pixel electrode is disclosed in JP 7-199190 A (1995). As shown in a cross sectional view in FIG. 6, aperture 27 is formed in pixel electrode 26 on substrate 1. Further, orientation control electrode 28 is formed near pixel electrode 26. The arrangement of pixel electrode 26 and orientation control electrode 28 is shown in a plan view in FIG. 7. Pixel electrode is surrounded by orientation control electrode 28 in order to regulate the direction of the electric field at the edge of pixel electrode 26. The load of the driving circuit for the display apparatus as shown in FIGS. 6 and 7 becomes heavy, because voltages are supplied for not only pixel electrode 26 and common electrode 15, but also orientation control electrode 28. Further, the connecting portions are indispensable in order to apply the same voltage to each of the divided portions. Therefore, the display apparatus as disclosed in JP 7-199190 A (1995) has the same disadvantage as that disclosed in JP 10-20323 A (1998).

SUMMARY OF THE INVENTION

Therefore, an object of the present invention is to provide a liquid crystal display apparatus which solves the above-mentioned problems.

The liquid crystal display apparatus of the present invention comprises a substrate with pixel electrodes, another substrate with a common electrode, and liquid crystal molecules between the two substrates. Apertures are formed to divide each of the pixel electrodes into pieces for generating oblique electric fields to divide an orientation of the liquid crystal molecules. The divided pieces of each of the pixel electrodes are connected electrically through an insulating layer which comprises more than two insulating sub-layers. Further, a control electrode for each of said pixel electrodes for controlling the orientation of the liquid crystal molecules is placed at a boundary of the insulating sub-layers.

According to the present invention, the variation in gradation in each pixel depending upon the visual angle is suppressed. Therefore, the present invention is suitable for a large area display which can be seen at a wide seeing angle.

This is because pixel electrode is divided completely by the aperture to generate oblique electric fields all over the border of the divided regions to regulate more stably the orientation direction of the liquid crystal molecules so as not to localize the regions for orientation division.

PREFERRED EMBODIMENT OF THE INVENTION

The liquid crystal display apparatus of the present invention aims at widening a visual angle by the oblique electric fields whose directions are different at the apertures. The orientations of the liquid crystal molecules are regulated stably, because the regions for orientation division are not localized. Accordingly, the variation in gradation in each pixel mainly depending upon the visual angle is suppressed. Therefore, pixel electrode is divided completely by the aperture to generate oblique electric fields all over the borders of the divided regions. Further, the divided pieces of the pixel electrodes are connected electrically at a layer different from the layer where the pixel electrodes are formed.

Figure 1:
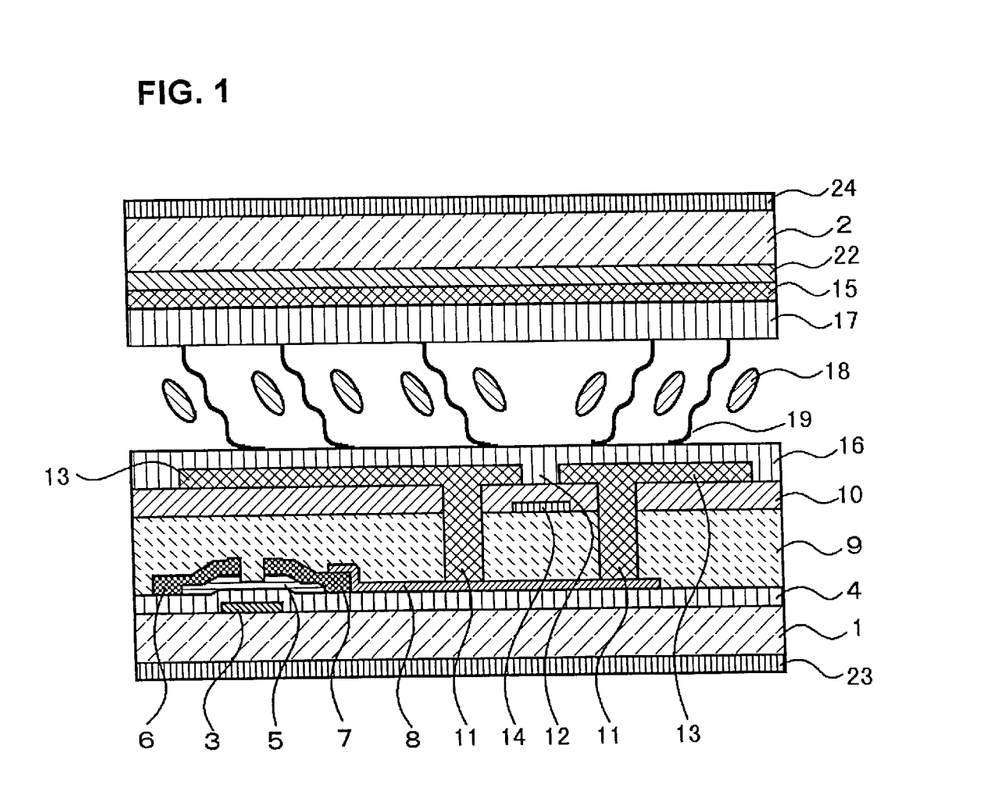
FIG. 1 is a cross sectional view of an example of the present invention.
Figure 2:
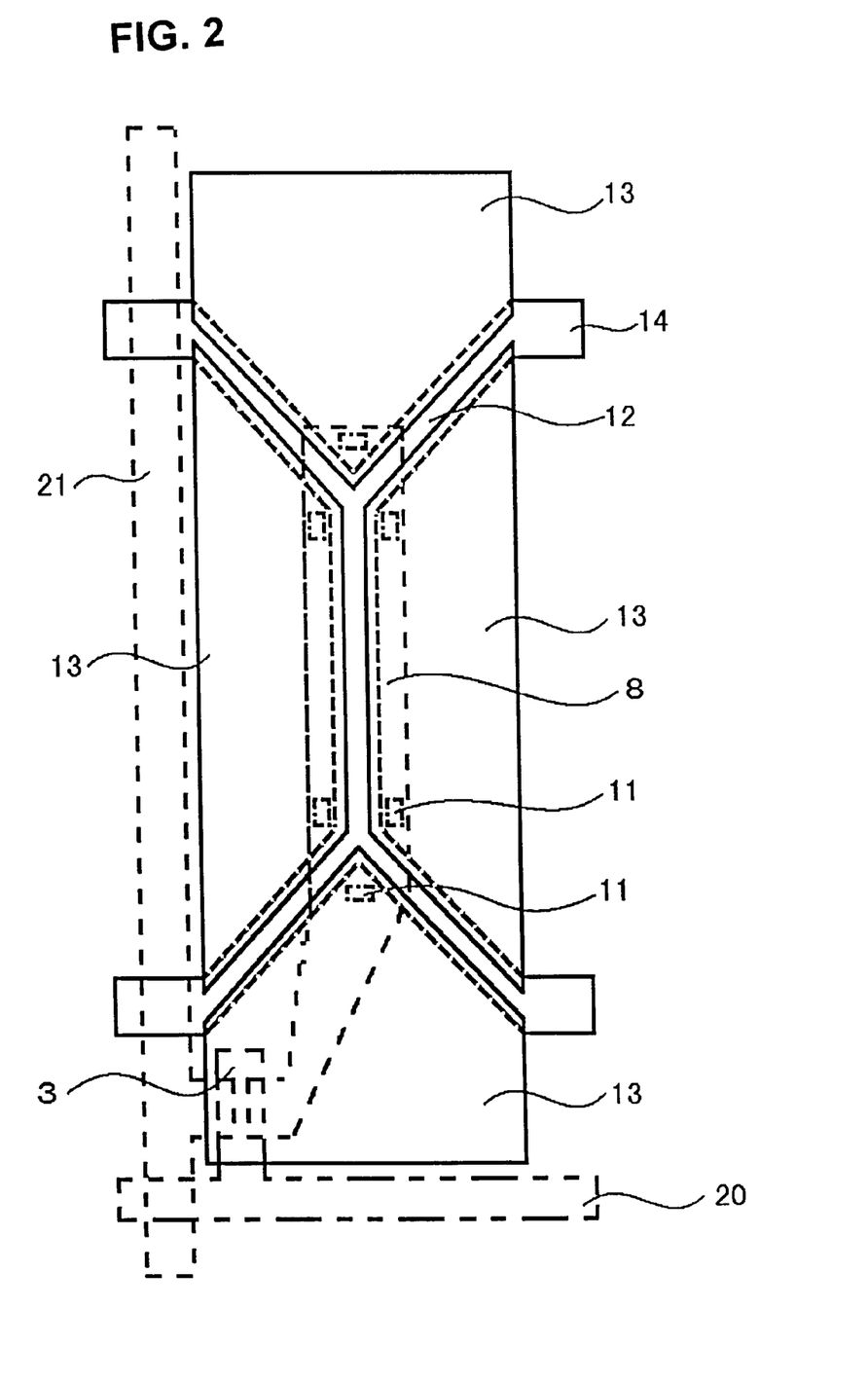
FIG. 2 is a plan view of an example of the present invention.

The structure of the liquid crystal display apparatus in a mode of embodiment of the present invention is explained, referring to a cross sectional view as shown in FIG. 1 and a plan view as shown in FIG. 2.

A switching means on substrate 1 of the liquid crystal display apparatus of the present invention comprises gate electrode 3, gate insulating film 4, semiconductor layer 5, drain electrode 6, and source electrode 7. The source voltage is applied pixel electrode 13 through electrode wiring portion 8, and contact hole 11 in insulating films 9 and 10. Here, pixel electrode 13 is divided by aperture 12. Under aperture 12, control electrode 14 is formed on the upper surface of insulating film 9. Further, common electrode 15 is formed on substrate 2. Further, orientation films 16 and 17 are formed on substrates 1 and 2, respectively. Liquid crystal molecules 18 are put between substrates 1 and 2. The oblique electric field is generated in the region from aperture 12 to the edge of pixel electrode 13 by the voltage applied to electrode 14. During the time when liquid crystal molecules 18 are obliquely oriented by the oblique electric field, UV light is exposed to the monomer or olygomer added beforehand in the liquid crystal layer to form polymer 19. Polymers 19 maintain the oblique orientations of liquid molecules 18, even after removing the voltage applied to control electrode 14. The orientation of liquid crystal molecules 18 is controlled by the voltage applied to pixel electrode 13. Control electrode 14 is not driven for display. The oblique electric field is generated in the entire borders of divided parts of pixel electrode 13, because pixel electrode is divided completely by aperture 12. Therefore, the orientations of liquid crystal molecules 18 also divided completely.

Examples of the liquid crystal display apparatus of the present invention are explained concretely. The present invention is not limited only to the following examples.

EXAMPLE 1

An example of a structure of the liquid crystal display apparatus of the present invention is explained, referring to a cross sectional view as shown in FIG. 1 and a plan view as shown in FIG. 2.

Single or multi layered gate electrode 3 and gate wiring 20 of metal such as Cr or ITO are formed on transparent substrate 1 such as glass by sputtering and photo-resist process. Then, gate insulating film 4 of silicon oxide and silicon nitride double layer are formed on gate electrode 3 and gate wiring 20, by CVD. Then, semiconductor layer 5 of amorphous silicon (a-Si and n+a-Si) is formed on gate insulating film 4, by CVD and photo-resist process. Next, single or multi layer of metal such as Cr or ITO is formed by sputtering and photo-resist process for drain electrode 6, source electrode 7, and drain wiring 21. In this way, drain wiring 21, gate wiring 20, and switching elements at the intersections of drain wiring 21 and gate wiring 20 are formed. Next, electrode wiring portion 8 of conductive film is formed. A transparent conductive film such as ITO film formed by sputtering and photo-resist process is preferable for wiring portion 8 to avoid the screening of transmitting light and the reduction of display area. Then, single or multi layered insulating film 9 of organic film such as acrylic polymers, benzocyclobutene polymerers, or polysilazane compounds, or inorganic film such as silicon nitride, is formed. Here, as an example, 300 nm silicon nitride layer is formed by CVD to protect the switching elements. Then, upon the silicon nitride layer, acrylic compound is spin-coated to form 2 to 5 μm film by baking. The organic layer is introduced to control the electric field from pixel electrode 13. Conversely, pixel electrode 13 can be formed apart from drain wiring 21, gate wiring 20, and the switching elements due to the presence of the organic layer.

Then, single or muti layered control electrode 14 of metal such as Cr, or ITO is formed by sputtering and photo-resist process. Then, single or multi layered insulating film 10 of organic film such as acrylic compounds, benzocyclobutene polymeric compounds, or polysilazane compounds, or inorganic film such as silicon nitride is formed. Here, for an example, 300 nm thick acrylic film is formed by spin coating and baking. The optimum thickness of insulating film 10 depends upon the materials to regulate the orientation of liquid crystal molecules 8 by the voltage applied to control electrode 14. Then, contact hole 1a is formed by photoresist process. Then, pixel electrode 13 of a transparent conductive film such as ITO is formed by sputtering and photo-resist process. Further, the pixel electrode 13 just above the control electrode is etched to form aperture 12. Pixel electrode 13 is divided completely by aperture 12 into several regions with different orientations of liquid crystal molecules 18. Each of the divided portions of pixel electrode 13 are connected electrically to electrode wiring portion 8 through contact hole 11.

Next, the structure of transparent substrate 2 which faces the substrate with semiconductor layer is explained. Color layer 22 for color display is formed on transparent substrate 2 such as glass. Then, on color layer 22, common electrode 15 of ITO is formed by sputtering. The structure of the transparent substrate as mentioned-above is well-known.

The upper-most layers of substrates 1 and 2 are orientation films 16 and 17 of organic films such as polyimide which are treated by rubbing if necessary. The liquid crystal is filled into the constant gap between substrates 1 and 2. The liquid crystal material is made of liquid crystal molecules 18 and a small quantity of a UV curing monomer or olygomer. One of the possible combination of orientation films 16 and 17 and liquid crystal is, for example, that of polyimide for horizontal orientation and TN liquid crystal. The rubbing directions of polyimide films are orthogonal with each other. The liquid crystal molecules 18 with pre-tilt angle almost 0 degree align in the direction perpendicular to the rubbing direction with pre-tilt angle almost 0 degree. It is desirable that the pre-tilt angle be zero to obtain an ideal orientation of liquid crystal molecules 18. More concretely, 1.0 wt % UV monomer may be added into TN liquid crystal with positive dielectric anisotropy. Further, 5 wt % polymerization initiator may be added into the UV curing monomer. On the other hand, no orientation treatment is made, when polyimide for vertical orientation is employed in case of birefringence control mode. In combination with the vertical orientation polyimide, a mixture of 99.0 wt % TN liquid crystal with negative dielectric anisotropy and 1.0 wt % UV curing monomer is used. Further, 5 wt % polymerization initiator may be added into the UV monomer.

The orientation direction of liquid crystal molecules 18 is divided at aperture 12 as a border by the oblique electric field which is generated by the several tens volts applied to control electrode 14 and by zero volt applied to both drain electrode 6 and common electrode 15. During the application of the voltages, UV curing monomer or olygomer becomes polymer 19 by the irradiation of UV light. Polymer is fixed in the direction of the oblique orientation of liquid crystal molecules 18 even after removing the applied voltages. The orientation of liquid crystal molecules 18 is controlled only by the voltage applied to pixel electrode 13. Therefore, only the voltage applied to pixel electrode 13 is needed for driving the display apparatus of the present invention. The oblique electric field is generated all over the borders of regions for orientation division, because aperture 12 completely divides pixel electrode 13. Accordingly, the orientation of liquid crystal molecules 18 is regulated more stably than in the conventional case wherein the aperture incompletely divides the pixel electrode.

Next, optical films 23 and 24 are stuck on the outer surface of substrates 1 and 2, respectively. Each of optical films 23 and 24 comprises a polarizing plate and often an optical compensation film. The absorption axis of the polarization plate on substrate 1 is made perpendicular to that on substrate 2. Further, each of the polarization directions may be perpendicular to the rubbing directions of substrates 1 and 2, respectively. The optical compensation film between the substrate and the polarization plate is used for the vertical orientation mode.

The liquid crystal display apparatus of the present invention can reproduce tone gradations by controlling the intensity of transmitting light under the application of the voltage to pixel electrode 13. The rising up directions are different depending the shape of the polymer in each of the regions divided for orientation division of orientation. According to the present invention, the tone of color in various regions compensates with each other to make a display less dependent upon the visual angle, while the tone of color is dependent upon the visual angle, according to the conventional apparatus wherein the orientation direction of the liquid crystal molecules are uniform in the whole display area. Further, according to the present invention, the variation in gradation in each pixel depending upon the visual angle is suppressed, because the orientation of the liquid crystal molecules is regulated more stably.

EXAMPLE 2

Figure 3:
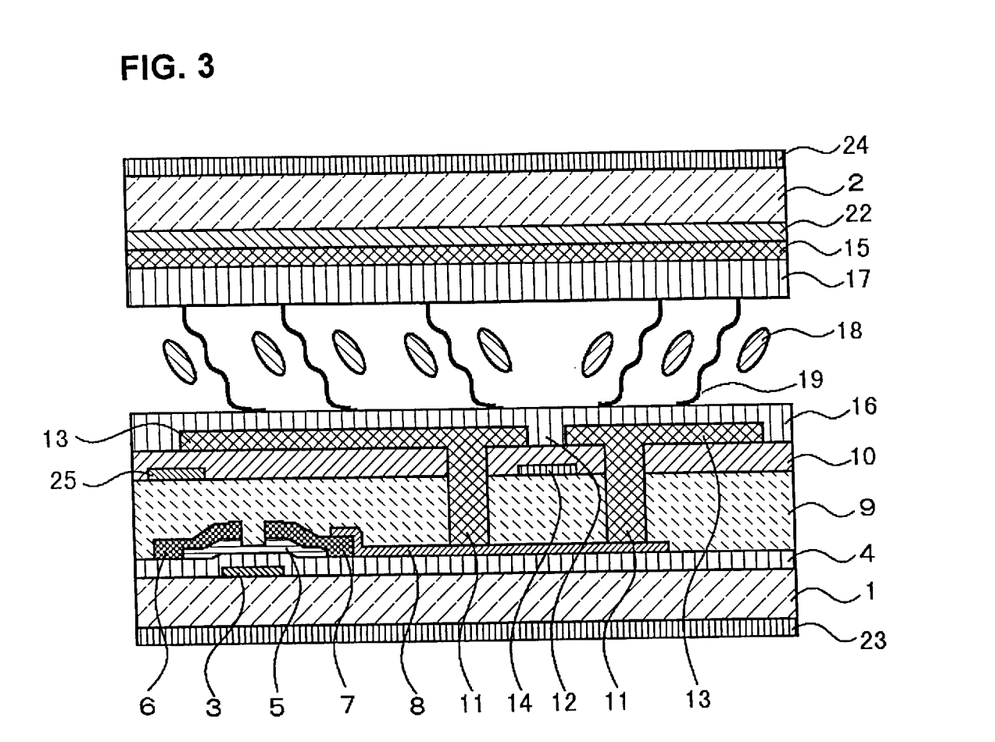
FIG. 3 is a cross sectional view of another example of the present invention.

Another example of the present invention is explained, referring to a cross sectional view as shown in FIG. 3.

Auxiliary capacitor electrode 25 is added in the same manufacturing step for forming control electrode 14 as shown in FIG. 1 for explaining the example 1. Auxiliary capacitor electrode 14 is made equipotential with common electrode 15 during the activation of display to stabilize the electric potential of pixel electrode 13 and to shield the lateral electric field by the wirings. Further, control electrode 14 is made equipotential with common electrode 15 to regulate the lateral electric field near the gaps f the divided portions of pixel electrode 13, whereby the electric potential of pixel electrode 13 is stabilized. Therefore, an excellent display quality is obtained.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. A liquid crystal display apparatus which comprises a substrate with pixel electrodes, another substrate with a common electrode, and liquid crystal molecules between said substrates, wherein:

apertures are formed to divide each of said pixel electrodes into pieces for generating oblique electric fields in order to divide an orientation of said liquid crystal molecules;

said pieces are connected electrically through an insulating layer which comprises more than two insulating sub-layers; and a control electrode for each of said pixel electrodes for controlling said orientation is placed at a boundary of said sub-layers.

2. The liquid crystal display apparatus according to claim 1, which further comprises an auxiliary electrode, for each of said pixel electrodes, which is connected electrically with said common electrode during displaying.

3. The liquid crystal display apparatus according to claim 1, wherein said control electrode is connected electrically with said common electrode during displaying.

\* \* \* \* \*